United States Patent
Govardhanam

(10) Patent No.: US 12,230,009 B2
(45) Date of Patent: Feb. 18, 2025

(54) DETERMINING OBJECT BEHAVIOR AND TRAJECTORIES

(71) Applicant: GM Cruise Holdings LLC, San Francisco, CA (US)

(72) Inventor: Hariprasad Govardhanam, Fremont, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 452 days.

(21) Appl. No.: 17/559,832

(22) Filed: Dec. 22, 2021

(65) Prior Publication Data

US 2023/0196727 A1 Jun. 22, 2023

(51) Int. Cl.
| | | |
|---|---|---|
| G06T 7/20 | (2017.01) | |
| G06V 10/74 | (2022.01) | |
| G06V 10/762 | (2022.01) | |
| G06V 10/82 | (2022.01) | |
| G06V 20/50 | (2022.01) | |

(52) U.S. Cl.
CPC .............. *G06V 10/762* (2022.01); *G06T 7/20* (2013.01); *G06V 10/761* (2022.01); *G06V 10/82* (2022.01); *G06V 20/50* (2022.01); *G06T 2207/30241* (2013.01)

(58) Field of Classification Search
CPC .... G06V 10/762; G06V 10/761; G06V 10/82; G06V 20/50; G06V 10/62; G06V 20/56; G06T 7/20; G06T 2207/30241
See application file for complete search history.

(56) References Cited

U.S. PATENT DOCUMENTS

| | | | |
|---|---|---|---|
| 2022/0180643 A1* | 6/2022 | Retterath | G06V 10/761 |
| 2022/0185171 A1* | 6/2022 | Kubotani | G05D 1/0088 |

* cited by examiner

*Primary Examiner* — Marcos L Torres
(74) *Attorney, Agent, or Firm* — Dimitri Kirimis

(57) ABSTRACT

System, methods, and computer-readable media for a training technique of an object trajectory prediction model that inputs semantic map data pertaining to an environment and trajectory data of an object into an autoencoder neural network, which outputs the original trajectory as a feature embedding vector. Each feature embedding vector serves as a unique identifier for each behavior. Cluster analysis is performed on feature embedding vectors to determine clusters, each associated with a particular behavior attribute.

12 Claims, 4 Drawing Sheets

DETERMINING OBJECT BEHAVIOR AND TRAJECTORIES

TECHNICAL FIELD

The subject technology provides solutions for improving object trajectory predictions and in particular, for improving object trajectory predictions using contextual trajectory attributes that are identified/determined using a machine-learning network.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Many autonomous vehicles make decisions based on prediction models that make predictions of paths of surrounding objects. Such prediction models can be improved to deliver a better experience for passengers.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
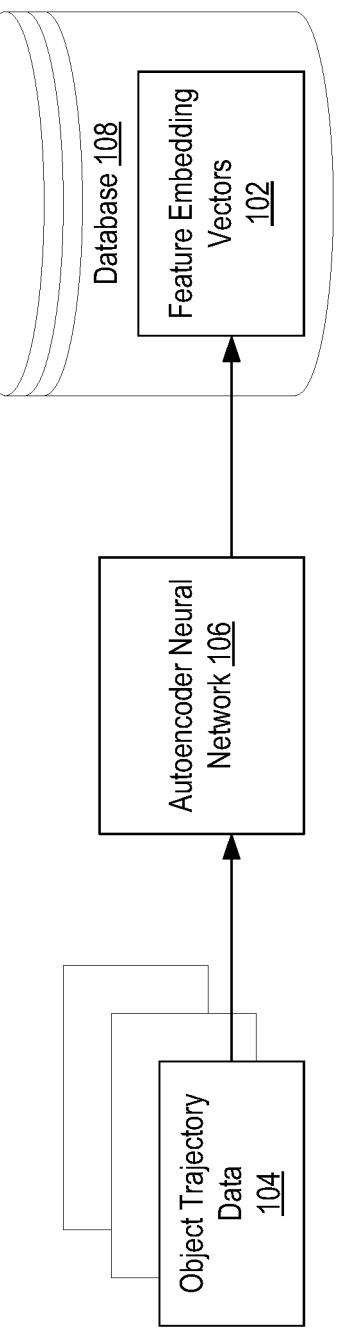
FIG. 1 shows an example setup of a machine-learning network that can produce feature embedding attributes, in accordance with some aspects of the present technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs) are commonly outfitted with sensors used to collect environmental data about a surrounding environment. In common driving scenarios, the collected data can include information pertaining to various objects in the environment, including but not limited to moving objects, such as other vehicles, pedestrians, or other Vulnerable Road Users (VRUs). In some implementations, the collected environmental data can include trajectory data associated with object motion through the environment. For example, trajectory data can include position/location/orientation information for an object at different times, and/or kinematic information pertaining to velocity and/or acceleration metrics for the object. In typical AV deployments, collected environmental data can be used (e.g., by the AV perception stack) to reason about objects in the environment. However, one limitation of conventional AV deployments is that it can be difficult for perception systems to identify (and therefore reasoning about) rarely encountered behaviors. By way of example, perception systems may have difficulty identifying atypical behaviors, such as when drivers exit their vehicles on roadway areas, or when pedestrians are encountered on high-throughput traffic areas, such as a section of highway or freeway where pedestrians traffic is exceedingly uncommon.

Aspects of the disclosed technology address some of the limitations of conventional perception systems by providing solutions for identifying and classifying infrequent/rare behaviors. In some approaches, trajectory data, including sensor data representing the motion/trajectories of one or more objects, can be provided to a generative machine-learning network, such as a Generative Adversarial Network (GAN), that includes an auto-encoder, e.g., one or more auto-encoding layers. Feature embeddings produced by the auto-encoder can be used to represent object behaviors, and in some implementations can be used to help classify or identify newly encountered or rare behavioral events. In some aspects, feature embeddings representing object behaviors can be stored, for example, to a common database. In such instances, unsupervised machine-learning approaches (such as clustering) may be used to classify or categorize behaviors represented in collected AV trajectory data. For example, in approaches where clustering is used, each cluster may represent a particular behavior type or behavior classification. By way of example, behavioral classifications may represent trajectory characteristics, or vehicle maneuvers, such as executing a u-turn, or parallel parking. However, it is understood that different clusters/categories may be used to represent a variety of different behaviors, and may depend on a type (classification) for the associated object, and/or data (e.g., map data) pertaining to a context (e.g., a location) in which the behavior was observed.

The autoencoder neural network for outputting feature embedding vectors representing one or more behavioral attributes with respect to trajectories of an object of the present technology solves at least these problems and provides other benefits, as will be apparent from the figures and description provided herein.

FIG. 1 illustrates an example setup 100 of a machine-learning network that can produce feature embedding attributes (or feature embedding vectors) 102 representing predicted object behavior, including common and uncommon behaviors for different object types. In some implementations, training can be performed on object trajectory data 104, which may be extracted from map data and sensor data, such as Light Detection and Ranging (LiDAR), Radio Detection And Ranging (RADAR), and camera data associated with a given object. The map data may include raw map data and semantic map data. Object trajectory data based on ground truth data may comprise the object's tracked trajectory, position, and orientation at various points in the trajectories.

The object trajectory data may then be provided to an autoencoder neural network 106 that produces semantic (vector) representations of intrinsic object characteristics, i.e., feature embedding vectors 102. In some aspects, the feature embedding vectors 102 can be used to characterize or classify one or more behaviors associated with the corresponding object. These semantic characteristics (or feature embeddings) can be represented as vectors encoded in one or more layers of a machine-learning model. The feature embedding vectors 102 may be stored in a database 108. Clustering analysis may further be performed on the feature embedding vectors 102 to determine object behavior attributes.

For training an Autonomous Vehicle (AV) stack, there may be a lot of trajectories of objects that the AV cannot recognize. When predictions are incorrect, corrective measures may be implemented to better the prediction. However, using a current method of writing heuristic rules for each common behavior, less common behavior and long-tail trajectories may not be considered.

In determining the behavior of an object, object trajectory data 104, which may include semantic map data about the environment (i.e., an intersection), and positioning, orientation, and trajectory of the object, is used as input in the autoencoder neural network 106. In some aspects, the autoencoder neural network 106 can be configured to generate feature embeddings that can be used as unique identifier for each behavior. Once feature embeddings have been generated from multiple of sets of trajectory data (e.g., for multiple objects and/or behavioral instances), the feature embeddings can be stored to a database and used to classify behaviors for previously unencountered scenarios and/or objects. In some approaches, the feature embedding vectors 102 can be used in an unsupervised learning setting (clustering, hashing techniques) to uniquely identify classes (or clusters) of similar object behaviors.

As such, feature embedding vectors 102 per behavior instance associated with rare events may also be captured. Clustering can classify certain object behaviors into certain categories. In some cases, for optimization, only object behavior that differed from that which the AV predicted may be provided to the autoencoder neural network 106 and mapped. In some cases, all events may be mapped to determine, for specific categories such as geographical locations, to encapsulate the safety or other characteristics.

Figure 2:
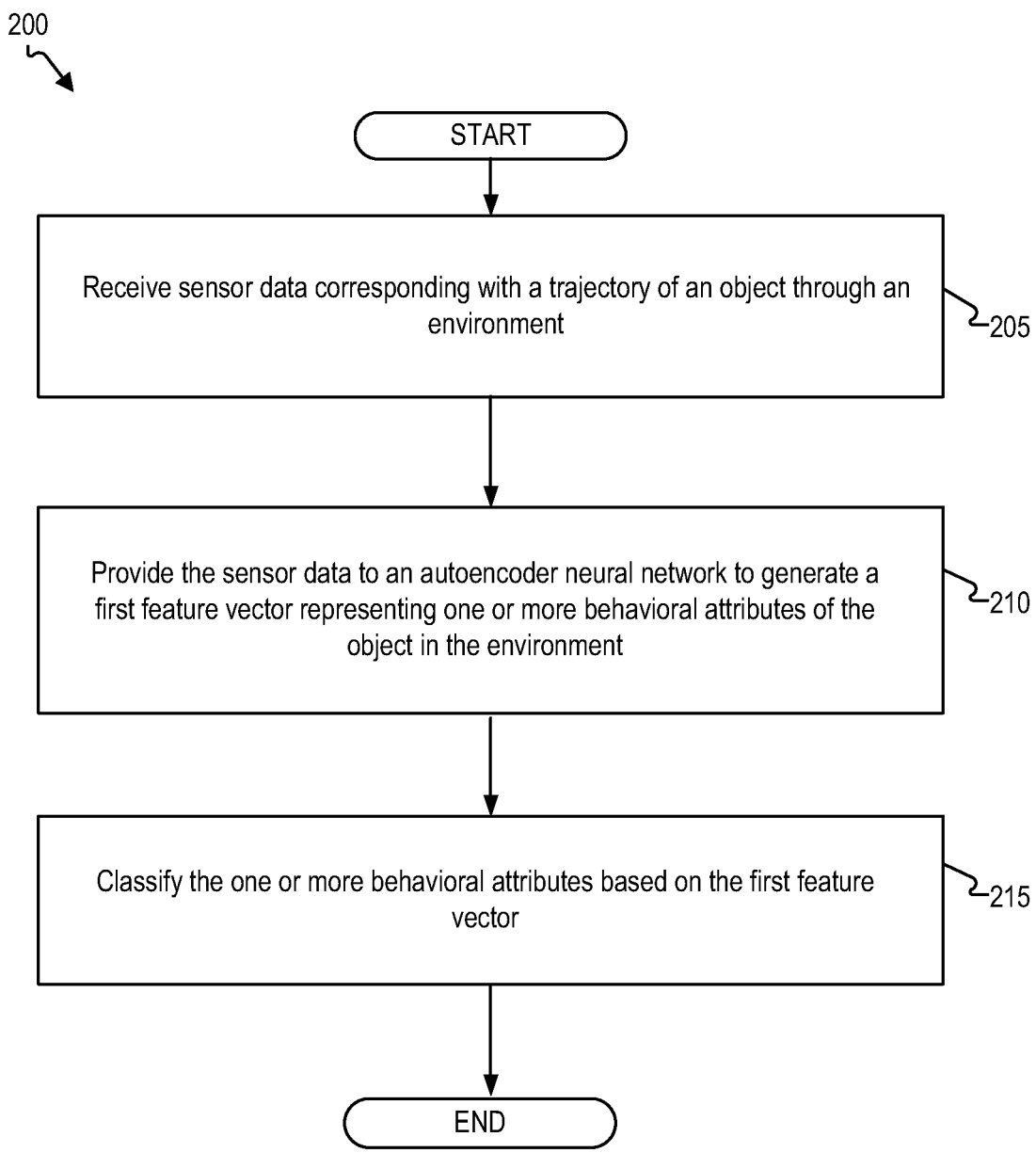
FIG. 2 shows a flow diagram of an example process for classifying behavior attributes based on feature vectors, in accordance with some aspects of the present technology.

FIG. 2 illustrates an example method 200 for generating feature vectors corresponding to a trajectory of an object and classifying behavior attributes based on the feature vectors. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some aspects, the method includes receiving sensor data corresponding with a trajectory of an object through an environment at step 205. For example, an AI/ML platform 354 illustrated in FIG. 3 may receive sensor data corresponding with a trajectory of an object through an environment.

According to some aspects, the method includes providing the sensor data to an autoencoder neural network to generate a first feature vector representing one or more behavioral attributes of the object in the environment at step 210. For example, the AI/ML platform 354 illustrated in FIG. 3 may provide the sensor data to an autoencoder neural network to generate a first feature vector representing one or more behavioral attributes of the object in the environment.

According to some aspects, the method includes classifying the one or more behavioral attributes based on the first feature vector at step 215. For example, the AI/ML platform 354 illustrated in FIG. 3 may classify the one or more behavioral attributes based on the first feature vector. In some aspects, the sensor data includes semantic map aspects and position and orientation of the object. In some aspects, the sensor data includes data received from at least one of radio detection and ranging (RADAR), Light Detection and Ranging (LiDAR), and camera technology.

In another example of classifying the one or more behavioral attributes at step 215, the method comprises comparing the first feature vector to one or more pre-existing behavior clusters. For example, the AI/ML platform 354 illustrated in FIG. 3 may compare the first feature vector to one or more pre-existing behavior clusters.

The autoencoder neural network 106 may not need any training data. It may merely be fed the same input and expected the same output. The input may be object trajectory data that is raw large data and the output is the entire trajectory in a compressed format, such as in 64 floating-point values. As such, the original trajectory is recoverable from the outputted value.

Further, the method comprises classifying the one or more behavioral attributes based on a calculated similarity to at least one of the one or more pre-existing behavior clusters. For example, the AI/ML platform 354 illustrated in FIG. 3 may classify the one or more behavioral attributes based on a calculated similarity to at least one of the one or more pre-existing behavior clusters.

Further, the method comprises determining one or more characteristics of a particular geographical region based on a classification for feature embedding vectors of respective objects in the particular geographical region. For example, the AI/ML platform 354 illustrated in FIG. 3 may determine one or more characteristics of a particular geographical region based on a classification for feature embedding vectors of respective objects in the particular geographical region. For example, object trajectories of various cities may differ and certain characteristics about a particular city may be determined based on such sub-classifications.

Furthermore, not all behaviors are predicated on the environment. Another agent moving can change the agent behavior. Therefore, other object trajectories need to be considered in some cases to determine and predict an object's trajectory. For objects that eventually interact, the trajectories of those objects are also used as input. As such, in some aspects, the sensor data further includes one or more other object trajectories that interacted with the object.

According to some aspects, the method includes setting a threshold for providing datasets to the autoencoder neural network for generating feature embedding vectors. For example, the AI/ML platform 354 illustrated in FIG. 3 may set a threshold for provide datasets to the autoencoder neural network for generate feature embedding vectors. In some aspects, the threshold is limited to predicted trajectories for objects that differ from trajectories that occurred.

According to some aspects, the method includes receiving a second dataset corresponding with map data of a second environment and a second trajectory data of a second object in the second environment. For example, the AI/ML platform 354 illustrated in FIG. 3 may receive a second dataset corresponding with map data of a second environment and a second trajectory data of a second object in the second environment.

According to some aspects, the method includes providing the second dataset to the autoencoder neural network to generate a second feature embedding vector, the second feature embedding vector representing one or more behavioral attributes associated with the second trajectory data. For example, the AI/ML platform 354 illustrated in FIG. 3 may provide the second dataset to the autoencoder neural network to generate a second feature embedding vector, the second feature embed vector representing one or more behavioral attributes associated with the second trajectory data.

According to some aspects, the method includes mapping the second feature embedding vector with other feature embedding vectors representing other behavioral attributes including the first feature embedding vector. For example, the AI/ML platform 354 illustrated in FIG. 3 may map the second feature embedding vector with other feature embedding vectors representing other behavioral attributes including the first feature embedding vector.

According to some aspects, the method includes determining the second feature embedding vector is in a same cluster as the first feature embedding vector. For example, the AI/ML platform 354 illustrated in FIG. 3 may determine the second feature embedding vector is in a same cluster as the first feature embedding vector.

According to some aspects, the method includes assigning a same predicted behavioral attribute to the second feature embedding vector as the first feature embedding vector. For example, the AI/ML platform 354 illustrated in FIG. 3 may assign a same predicted behavioral attribute to the second feature embedding vector as the first feature embedding vector.

Figure 3:
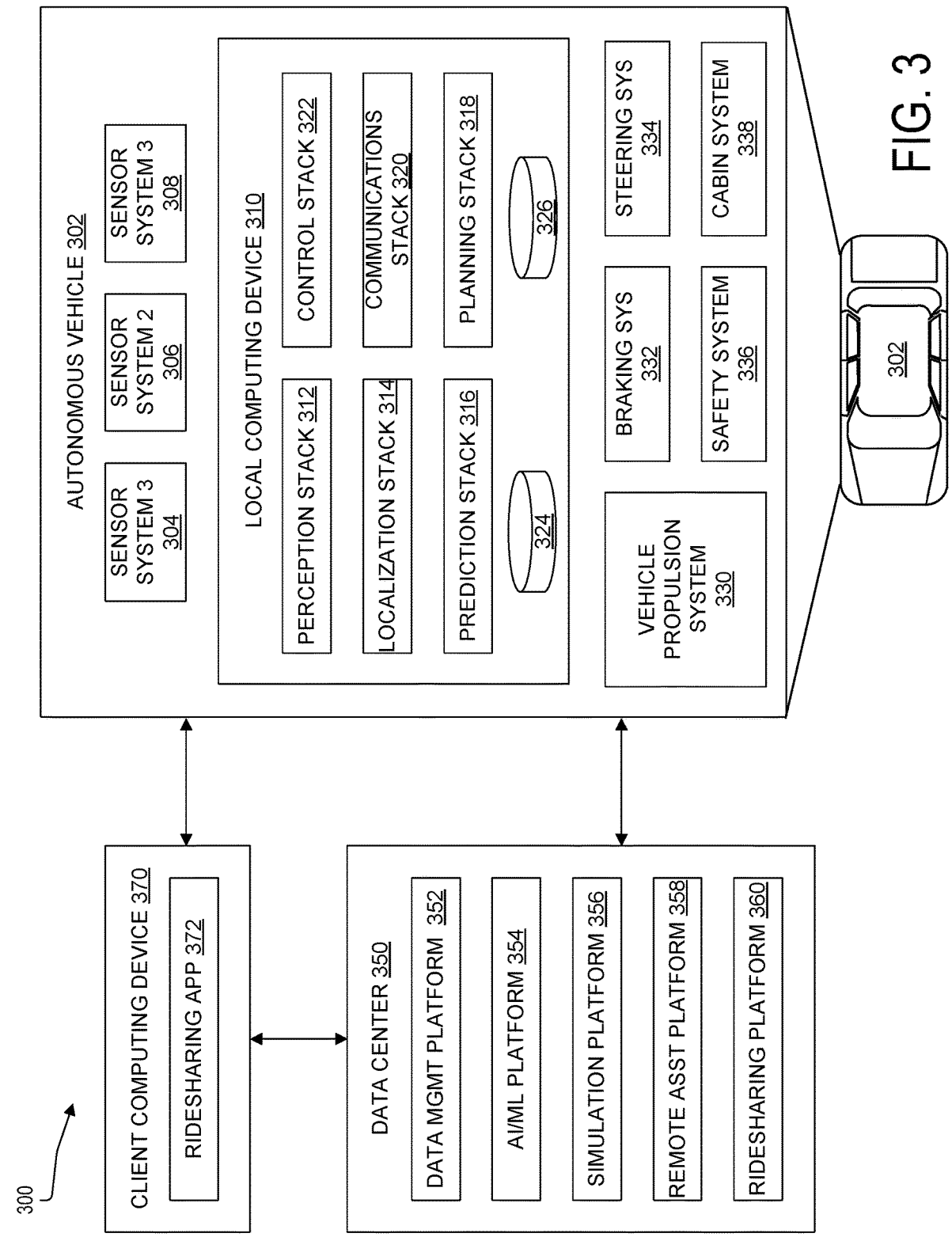
FIG. 3 shows an example of a system for managing one or more Autonomous Vehicles (AVs) data in accordance with some aspects of the present technology.

FIG. 3 illustrates an example of an AV management system 300. One of ordinary skill in the art will understand that, for the AV management system 300 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 300 includes an AV 302, a data center 350, and a client computing device 370. The AV 302, the data center 350, and the client computing device 370 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 302 can navigate roadways without a human driver based on sensor signals generated by multiple sensor systems 304, 306, and 308. The sensor systems 304-308 can include different types of sensors and can be arranged about the AV 302. For instance, the sensor systems 304-308 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 304 can be a camera system, the sensor system 306 can be a LIDAR system, and the sensor system 308 can be a RADAR system. Other embodiments may include any other number and type of sensors.

The AV 302 can also include several mechanical systems that can be used to maneuver or operate the AV 302. For instance, the mechanical systems can include a vehicle propulsion system 330, a braking system 332, a steering system 334, a safety system 336, and a cabin system 338, among other systems. The vehicle propulsion system 330 can include an electric motor, an internal combustion engine, or both. The braking system 332 can include an engine brake, brake pads, actuators, and/or any other suitable componentry configured to assist in decelerating the AV 302. The steering system 334 can include suitable componentry configured to control the direction of movement of the AV 302 during navigation. The safety system 336 can include lights and signal indicators, a parking brake, airbags, and so forth. The cabin system 338 can include cabin temperature control systems, in-cabin entertainment systems, and so forth. In some embodiments, the AV 302 might not include human driver actuators (e.g., steering wheel, handbrake, foot brake pedal, foot accelerator pedal, turn signal lever, window wipers, etc.) for controlling the AV 302. Instead, the cabin system 338 can include one or more client interfaces (e.g., Graphical User Interfaces (GUIs), Voice User Interfaces (VUIs), etc.) for controlling certain aspects of the mechanical systems 330-338.

The AV 302 can additionally include a local computing device 310 that is in communication with the sensor systems 304-308, the mechanical systems 330-338, the data center 350, and the client computing device 370, among other systems. The local computing device 310 can include one or more processors and memory, including instructions that can be executed by the one or more processors. The instructions can make up one or more software stacks or components responsible for controlling the AV 302; communicating with the data center 350, the client computing device 370, and other systems; receiving inputs from riders, passengers, and other entities within the AV's environment; logging metrics collected by the sensor systems 304-308; and so forth. In this example, the local computing device 310 includes a perception stack 312, a mapping and localization stack 314, a prediction stack 316, a planning stack 318, a communications stack 320, a control stack 322, an AV operational database 324, and an HD geospatial database 326, among other stacks and systems.

The perception stack 312 can enable the AV 302 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 304-308, the mapping and localization stack 314, the HD geospatial database 326, other components of the AV, and other data sources (e.g., the data center 350, the client computing device 370, third party data sources, etc.). The perception stack 312 can detect and classify objects and determine their current locations, speeds, directions, and the like. In addition, the perception stack 312 can determine the free space around the AV 302 (e.g., to maintain a safe distance from other objects, change lanes, park the AV, etc.). The perception stack 312 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 314 can determine the AV's position and orientation (pose) using different methods from multiple systems (e.g., GPS, IMUs, cameras, LIDAR, RADAR, ultrasonic sensors, the HD geospatial database 326, etc.). For example, in some embodiments, the AV 302 can compare sensor data captured in real-time by the sensor systems 304-308 to data in the HD geospatial database 326 to determine its precise (e.g., accurate to the order of a few centimeters or less) position and orientation. The AV 302 can focus its search based on sensor data from one or more first sensor systems (e.g., GPS) by matching sensor data from one or more second sensor systems (e.g., LIDAR). If the mapping and localization information from one system is unavailable, the AV 302 can use mapping and localization information from a redundant system and/or from remote data sources.

The prediction stack 316 can receive information from the localization stack 314 and objects identified by the perception stack 312 and predict a future path for the objects. In some embodiments, the prediction stack 316 can output several likely paths that an object is predicted to take along with a probability associated with each path. For each predicted path, the prediction stack 316 can also output a range of points along the path corresponding to a predicted location of the object along the path at future time intervals along with an expected error value for each of the points that indicates a probabilistic deviation from that point.

The planning stack 318 can determine how to maneuver or operate the AV 302 safely and efficiently in its environment. For example, the planning stack 318 can receive the location, speed, and direction of the AV 302, geospatial data, data regarding objects sharing the road with the AV 302 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 302 from one point to another and outputs from the perception stack 312, localization stack 314, and prediction stack 316. The planning stack 318 can determine multiple sets of one or more mechanical operations that the AV 302 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 318 can select from multiple backup plans to carry out. For example, while preparing to change lanes to turn right at an intersection, another vehicle may aggressively cut into the destination lane, making the lane change unsafe. The planning stack 318 could have already determined an alternative plan for such an event. Upon its occurrence, it could help direct the AV 302 to go around the block instead of blocking a current lane while waiting for an opening to change lanes.

The control stack 322 can manage the operation of the vehicle propulsion system 330, the braking system 332, the steering system 334, the safety system 336, and the cabin system 338. The control stack 322 can receive sensor signals from the sensor systems 304-308 as well as communicate with other stacks or components of the local computing device 310 or a remote system (e.g., the data center 350) to effectuate operation of the AV 302. For example, the control stack 322 can implement the final path or actions from the multiple paths or actions provided by the planning stack 318. This can involve turning the routes and decisions from the planning stack 318 into commands for the actuators that control the AV's steering, throttle, brake, and drive unit.

The communications stack 320 can transmit and receive signals between the various stacks and other components of the AV 302 and between the AV 302, the data center 350, the client computing device 370, and other remote systems. The communications stack 320 can enable the local computing device 310 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 320 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 326 can store HD maps and related data of the streets upon which the AV 302 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 324 can store raw AV data generated by the sensor systems 304-308, stacks 312-322, and other components of the AV 302 and/or data received by the AV 302 from remote systems (e.g., the data center 350, the client computing device 370, etc.). In some embodiments, the raw AV data can include HD LIDAR point cloud data, image data, RADAR data, GPS data, and other sensor data that the data center 350 can use for creating or updating AV geospatial data or for creating simulations of situations encountered by AV 302 for future testing or training of various machine learning algorithms that are incorporated in the local computing device 310.

The data center 350 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 350 can include one or more computing devices remote to the local computing device 310 for managing a fleet of AVs and AV-related services. For example, in addition to managing the AV 302, the data center 350 may also support a ridesharing service, a delivery service, a remote/roadside assistance service, street services (e.g., street mapping, street patrol, street cleaning, street metering, parking reservation, etc.), and the like.

The data center 350 can send and receive various signals to and from the AV 302 and the client computing device 370. These signals can include sensor data captured by the sensor systems 304-308, roadside assistance requests, software updates, ridesharing pick-up and drop-off instructions, and so forth. In this example, the data center 350 includes a data management platform 352, an Artificial Intelligence/Machine Learning (AI/ML) platform 354, a simulation platform 356, a remote assistance platform 358, and a ridesharing platform 360, among other systems.

The data management platform 352 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 350 can access data stored by the data management platform 352 to provide their respective services.

The AI/ML platform 354 can provide the infrastructure for training and evaluating machine learning algorithms for operating the AV 302, the simulation platform 356, the remote assistance platform 358, the ridesharing platform 360, and other platforms and systems. Using the AI/ML platform 354, data scientists can prepare data sets from the data management platform 352; select, design, and train machine learning models; evaluate, refine, and deploy the models; maintain, monitor, and retrain the models; and so on.

The simulation platform 356 can enable testing and validation of the algorithms, machine learning models, neural networks, and other development efforts for the AV 302, the remote assistance platform 358, the ridesharing platform 360, and other platforms and systems. The simulation platform 356 can replicate a variety of driving environments and/or reproduce real-world scenarios from data captured by the AV 302, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 358 can generate and transmit instructions regarding the operation of the AV 302. For example, in response to an output of the AI/ML platform 354 or other system of the data center 350, the remote assistance platform 358 can prepare instructions for one or more stacks or other components of the AV 302.

The ridesharing platform 360 can interact with a customer of a ridesharing service via a ridesharing application 372 executing on the client computing device 370. The client computing device 370 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 372. The client computing device 370 can be a customer's mobile computing device or a computing device integrated with the AV 302 (e.g., the local computing device 310). The ridesharing platform 360 can receive requests to pick up or drop off from the ridesharing application 372 and dispatch the AV 302 for the trip.

Figure 4:
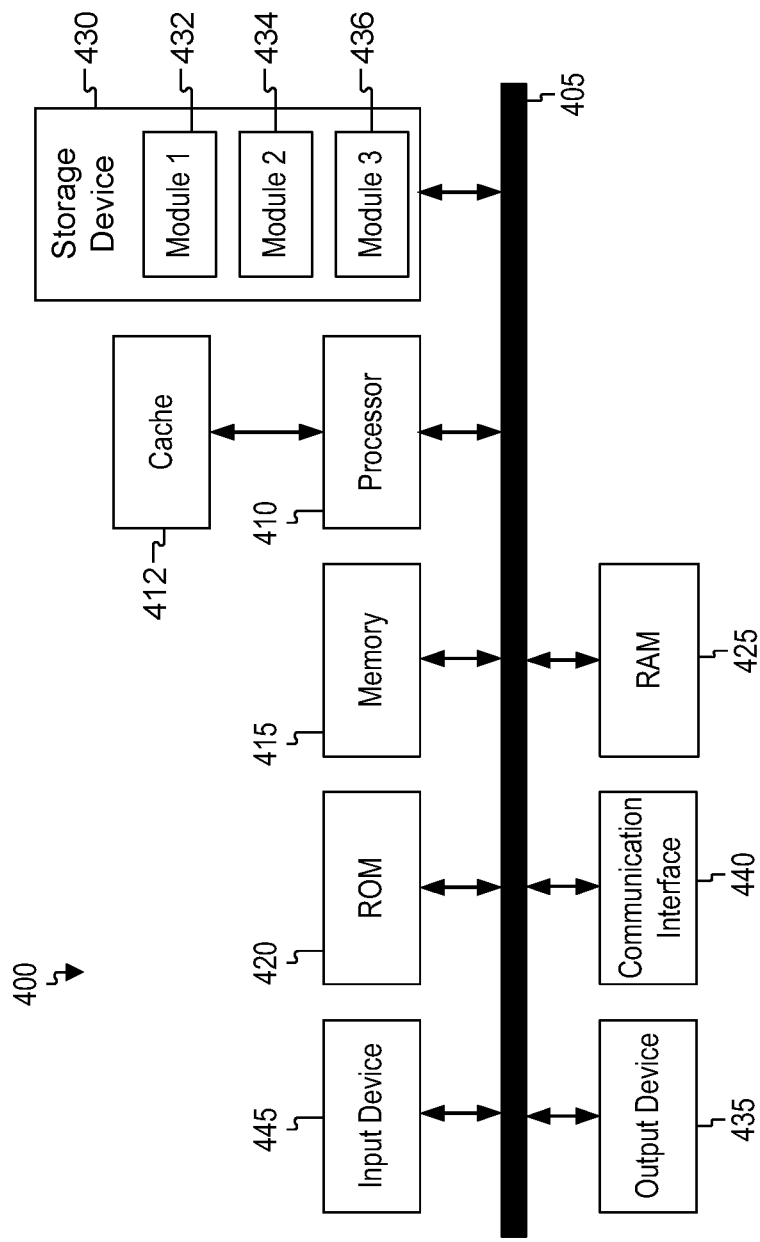
FIG. 4 shows an example system for implementing certain aspects of the present technology.

FIG. 4 shows an example of computing system 400, which can be for example any computing device making up the data center 305 and the AI/ML platform 354, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A computer-implemented comprising: receiving sensor data corresponding with a trajectory of an object through an environment; providing the sensor data to an autoencoder neural network to generate a first feature vector representing one or more behavioral attributes of the object in the environment; and classifying the one or more behavioral attributes based on the first feature vector.

Aspect 2: The computer-implemented of Aspect 1, wherein the classifying the one or more behavioral attributes based on the first feature vector further comprises: comparing the first feature vector to one or more pre-existing behavior clusters; and classifying the one or more behavioral attributes based on a calculated similarity to at least one of the one or more pre-existing behavior clusters.

Aspect 3: The computer-implemented of any of Aspects 1 to 2, further comprising: determining one or more characteristics of a particular geographical region based on a classification for feature embedding vectors of respective objects in the particular geographical region.

Aspect 4: The computer-implemented of any of Aspects 1 to 3, wherein the sensor data further includes one or more other object trajectories that interacted with the object.

Aspect 5: The computer-implemented of any of Aspects 1 to 4, further comprising: setting a threshold for providing datasets to the autoencoder neural network for generating feature embedding vectors, wherein the threshold is limited to predicted trajectories for objects that differ from trajectories that occurred.

Aspect 6: The computer-implemented of any of Aspects 1 to 5, wherein the sensor data includes semantic map aspects and position and orientation of the object.

Aspect 7: The computer-implemented of any of Aspects 1 to 6, wherein the sensor data includes data received from at least one of radio detection and ranging (RADAR), Light Detection and Ranging (LiDAR), and camera technology.

Aspect 8: The computer-implemented of any of Aspects 1 to 7, further comprising: receiving a second dataset corresponding with map data of a second environment and a second trajectory data of a second object in the second environment; providing the second dataset to the autoencoder neural network to generate a second feature embedding vector, the second feature embedding vector representing one or more behavioral attributes associated with the second trajectory data; mapping the second feature embedding vector with other feature embedding vectors representing other behavioral attributes including the first feature embedding vector; determining the second feature embedding vector is in a same cluster as the first feature embedding vector; and assigning a same predicted behavioral attribute to the second feature embedding vector as the first feature embedding vector.

Aspect 9: A system comprising: a storage configured to store instructions; a processor configured to execute the instructions and cause the processor to: receive sensor data corresponding with a trajectory of an object through an environment, provide the sensor data to an autoencoder neural network to generate a first feature vector representing one or more behavioral attributes of the object in the environment, and classify the one or more behavioral attributes based on the first feature vector.

Aspect 10: The system of Aspect 9, wherein the processor is configured to execute the instructions and cause the processor to: compare the first feature vector to one or more pre-existing behavior clusters; and classify the one or more behavioral attributes based on a calculated similarity to at least one of the one or more pre-existing behavior clusters.

Aspect 11: The system of any of Aspects 9 to 10, wherein the processor is configured to execute the instructions and cause the processor to: determine one or more characteristics of a particular geographical region based on a classification for feature embedding vectors of respective objects in the particular geographical region.

Aspect 12: The system of any of Aspects 9 to 11, wherein the sensor data further includes one or more other object trajectories that interacted with the object.

Aspect 13: The system of any of Aspects 9 to 12, wherein the processor is configured to execute the instructions and cause the processor to: set a threshold for provide datasets to the autoencoder neural network for generate feature embedding vectors, wherein the threshold is limited to predicted trajectories for objects that differ from trajectories that occurred.

Aspect 14: The system of any of Aspects 9 to 13, wherein the sensor data includes semantic map aspects and position and orientation of the object.

Aspect 15: The system of any of Aspects 9 to 14, wherein the sensor data includes data received from at least one of radio detection and ranging (RADAR), Light Detection and Ranging (LiDAR), and camera technology.

Aspect 16: The system of any of Aspects 9 to 15, wherein the processor is configured to execute the instructions and cause the processor to: receive a second dataset corresponding with map data of a second environment and a second trajectory data of a second object in the second environment; provide the second dataset to the autoencoder neural network to generate a second feature embedding vector, the second feature embed vector representing one or more behavioral attributes associated with the second trajectory data; map the second feature embedding vector with other feature embedding vectors representing other behavioral attributes including the first feature embedding vector; determine the second feature embedding vector is in a same cluster as the first feature embedding vector; and assign a same predicted behavioral attribute to the second feature embedding vector as the first feature embedding vector.

Aspect 17: A non-transitory computer-readable medium comprising instructions, the instructions, when executed by a computing system, cause the computing system to: receive sensor data corresponding with a trajectory of an object through an environment; provide the sensor data to an autoencoder neural network to generate a first feature vector representing one or more behavioral attributes of the object in the environment; and classify the one or more behavioral attributes based on the first feature vector.

Aspect 18: The computer-readable medium of Aspect 17, wherein the computer-readable medium further comprises instructions that, when executed by the computing system, cause the computing system to: compare the first feature vector to one or more pre-existing behavior clusters; and classify the one or more behavioral attributes based on a calculated similarity to at least one of the one or more pre-existing behavior clusters.

Aspect 19: The computer-readable medium of any of Aspects 17 to 18, wherein the computer-readable medium further comprises instructions that, when executed by the computing system, cause the computing system to: determine one or more characteristics of a particular geographical region based on a classification for feature embedding vectors of respective objects in the particular geographical region.

Aspect 20: The computer-readable medium of any of Aspects 17 to 19, the sensor data further includes one or more other object trajectories that interacted with the object.

Aspect 21: The computer-readable medium of any of Aspects 17 to 20, wherein the computer-readable medium further comprises instructions that, when executed by the computing system, cause the computing system to: set a threshold for provide datasets to the autoencoder neural network for generate feature embedding vectors, wherein the threshold is limited to predicted trajectories for objects that differ from trajectories that occurred.

Aspect 22: The computer-readable medium of any of Aspects 17 to 21, the sensor data includes semantic map aspects and position and orientation of the object.

Aspect 23: The computer-readable medium of any of Aspects 17 to 22, the sensor data includes data received from at least one of radio detection and ranging (RADAR), Light Detection and Ranging (LiDAR), and camera technology.

Aspect 24: The computer-readable medium of any of Aspects 17 to 23, wherein the computer-readable medium further comprises instructions that, when executed by the computing system, cause the computing system to: receive a second dataset corresponding with map data of a second environment and a second trajectory data of a second object in the second environment; provide the second dataset to the autoencoder neural network to generate a second feature embedding vector, the second feature embed vector representing one or more behavioral attributes associated with the second trajectory data; map the second feature embedding vector with other feature embedding vectors representing other behavioral attributes including the first feature embedding vector; determine the second feature embedding vector is in a same cluster as the first feature embedding vector; and assign a same predicted behavioral attribute to the second feature embedding vector as the first feature embedding vector.

What is claimed is:

1. A computer-implemented method comprising:
receiving sensor data corresponding with a trajectory of an object through an environment;
providing the sensor data to an autoencoder neural network to generate a first feature vector representing one or more behavioral attributes of the object in the environment, wherein the sensor data is provided to the autoencoder neural network to generate the first feature vector based on a threshold that limits sensor data provided to the autoencoder neural network to sensor data corresponding to objects whose predicted trajectories differ from trajectories that actually occurred for those objects;
classifying the one or more behavioral attributes based on the first feature vector, wherein the classifying the one or more behavioral attributes based on the first feature vector further comprises:
comparing the first feature vector to one or more pre-existing behavior clusters, and
classifying the one or more behavioral attributes based on a calculated similarity to at least one of the one or more pre-existing behavior clusters; and
determining one or more characteristics of a particular city based on a classification for feature embedding vectors of respective objects in the particular city.

2. The computer-implemented method of claim 1, wherein the sensor data further includes one or more other object trajectories that interacted with the object.

3. The computer-implemented method of claim 1, wherein the sensor data includes semantic map aspects and position and orientation of the object.

4. The computer-implemented method of claim 1, wherein the sensor data includes data received from at least one of radio detection and ranging (RADAR), Light Detection and Ranging (LiDAR), and camera technology.

5. The computer-implemented method of claim 1, further comprising:
receiving a second dataset corresponding with map data of a second environment and a second trajectory data of a second object in the second environment;
providing the second dataset to the autoencoder neural network to generate a second feature embedding vector, the second feature embedding vector representing one or more behavioral attributes associated with the second trajectory data;
mapping the second feature embedding vector with other feature embedding vectors representing other behavioral attributes including the fast feature embedding vector;
determining the second feature embedding vector is in a same cluster as the first feature embedding vector; and
assigning a same predicted behavioral attribute to the second feature embedding vector as the first feature embedding vector.

6. A system comprising:
a storage configured to store instructions; and
a processor configured to execute the instructions and cause the processor to:
receive sensor data corresponding with a trajectory of an object through an environment;
provide the sensor data to an autoencoder neural network to generate a first feature vector representing one or more behavioral attributes of the object in the environment, wherein the sensor data is provided to the autoencoder neural network to generate the first feature vector based on a threshold that limits sensor data provided to the autoencoder neural network to sensor data corresponding to objects whose predicted trajectories differ from trajectories that actually occurred for those objects;
classify the one or more behavioral attributes based on the first feature vector, wherein the classifying the one or more behavioral attributes based on the first feature vector further comprises:
comparing the first feature vector to one or more pre-existing behavior clusters, and
classifying the one or more behavioral attributes based on a calculated similarity to at least one of the one or more pre-existing behavior clusters; and
determine one or more characteristics of a particular city based on a classification for feature embedding vectors of respective objects in the particular city.

7. The system of claim 6, wherein the sensor data further includes one or more other object trajectories that interacted with the object.

8. The system of claim 6, wherein the sensor data includes semantic map aspects and position and orientation of the object.

9. The system of claim 6, wherein the sensor data includes data received from at least one of radio detection and ranging (RADAR), Light Detection and Ranging (LiDAR), and camera technology.

10. The system of claim 6, wherein the processor is configured to execute the instructions and cause the processor to:
receive a second dataset corresponding with map data of a second environment and a second trajectory data of a second object in the second environment;
provide the second dataset to the autoencoder neural network to generate a second feature embedding vector, the second feature embedding vector representing one or more behavioral attributes associated with the second trajectory data;
map the second feature embedding vector with other feature embedding vectors representing other behavioral attributes including the first feature embedding vector;
determine the second feature embedding vector is in a same cluster as the first feature embedding vector, and
assign a same predicted behavioral attribute to the second feature embedding vector as the first feature embedding vector.

11. A non-transitory computer-readable medium comprising instructions, the instructions, when executed by a computing system, cause the computing system to:
receive sensor data corresponding with a trajectory of an object through an environment;
provide the sensor data to an autoencoder neural network to generate a first feature vector representing one or more behavioral attributes of the object in the environment, wherein the sensor data is provided to the autoencoder neural network to generate the first feature vector based on a threshold that limits sensor data provided to the autoencoder neural network to sensor data corresponding to objects whose predicted trajectories differ from trajectories that actually occurred for those objects; and classify the one or more behavioral attributes based on the first feature vector, wherein the classifying the one or more behavioral attributes based on the first feature vector further comprises:
  comparing the first feature vector to one or more pre-existing behavior clusters, and
  classifying the one or more behavioral attributes based on a calculated similarity to at least one of the one or more pre-existing behavior clusters; and
determine one or more characteristics of a particular city based on a classification for feature embedding vectors of respective objects in the particular city.

12. The computer-readable medium of claim 11, the sensor data further includes one or more other object trajectories that interacted with the object.

* * * * *